US008233432B2

(12) United States Patent
Northcutt et al.

(10) Patent No.: US 8,233,432 B2
(45) Date of Patent: Jul. 31, 2012

(54) ENSURING PHYSICAL LOCALITY OF ENTITIES SHARING DATA

(75) Inventors: J. Duane Northcutt, Menlo Park, CA (US); Brian K. Schmidt, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 954 days.

(21) Appl. No.: 11/848,641

(22) Filed: Aug. 31, 2007

(65) Prior Publication Data

US 2009/0059797 A1 Mar. 5, 2009

(51) Int. Cl.
*H04W 4/00* (2009.01)
*H04W 72/00* (2009.01)
*H04M 1/00* (2006.01)

(52) U.S. Cl. .......................... 370/328; 455/450; 455/566

(58) Field of Classification Search .................. 370/395, 370/338, 331, 336, 401, 328, 350, 280; 455/434, 455/513; 375/355; 342/357, 375; 701/21, 701/207; 702/176
See application file for complete search history.

(56) References Cited

U.S. PATENT DOCUMENTS

| | | | | |
|---|---|---|---|---|
| 6,094,421 | A * | 7/2000 | Scott | 370/280 |
| 6,526,039 | B1 * | 2/2003 | Dahlman et al. | 370/350 |
| 6,823,284 | B2 * | 11/2004 | Gfeller et al. | 702/176 |
| 7,016,320 | B1 * | 3/2006 | Petersson et al. | 370/331 |
| 7,454,204 | B2 * | 11/2008 | Lucidarme et al. | 455/434 |
| RE40,642 | E * | 2/2009 | Harrison et al. | 701/207 |
| 2001/0038674 | A1 * | 11/2001 | Trans | 375/355 |
| 2003/0222817 | A1 * | 12/2003 | Gfeller et al. | 342/375 |
| 2004/0090943 | A1 * | 5/2004 | da Costa et al. | 370/338 |
| 2005/0026563 | A1 | 2/2005 | Leeper et al. | |
| 2005/0144468 | A1 | 6/2005 | Northcutt et al. | |
| 2005/0280576 | A1 * | 12/2005 | Shemesh et al. | 342/357.1 |
| 2006/0293806 | A1 * | 12/2006 | Basilico | 701/21 |
| 2007/0010270 | A1 * | 1/2007 | Dillon | 455/513 |

FOREIGN PATENT DOCUMENTS

| | | |
|---|---|---|
| EP | 1482682 | 12/2004 |
| WO | WO 03/079638 | 9/2003 |
| WO | WO-03079638 | 9/2003 |

OTHER PUBLICATIONS

"8029P033PCT ISR WO Mailed Nov. 12, 2008 for PCT/US2008/071669", Whole Document.

(Continued)

*Primary Examiner* — Hassan Phillips
*Assistant Examiner* — Prenell Jones
(74) *Attorney, Agent, or Firm* — Blakely Sokoloff Taylor Zafman LLP

(57) ABSTRACT

A method and system for ensuring that data is only distributed within a certain physical area are disclosed. In one embodiment, a method provides that data is distributed only if the distance between a source and a sink is within a distance threshold. Under this system, the distance between the source and the sink may be estimated directly or indirectly. In some embodiments, the distance may be estimated by estimating the propagation delay for a signal traversing between the devices. The physical distance between the devices may be determined from the propagation delay. If the physical distance is outside a threshold value, the source may be prohibited from transmitting the data or the sink may refuse to display the data.

10 Claims, 12 Drawing Sheets

OTHER PUBLICATIONS

Izquierdo, Feman, et al., "Performance Evaluation of a TOA-based Trilateration Method to Locate Terminals in WLAN", *International Symposium on Wireless Pervasive Computing, XX, XX*, vol. 2006, (Jan. 16, 2006), Whole Document.

*Int'l Preliminary Report on Patentability for Int'Application No. PCT/US2008/071669 mailed Mar. 11, 2010.*

First Office Action for Taiwan Patent Application No. 097129576, Mailed Nov. 3, 2011, 5 pages.

Office Action from EP08782550.1 mailed Jan. 5, 2012 5 pgs.

Kavitha Muthukrishman, Georgi Koprinkov, Nirvana meratnia, Maria Lijding: "Using time-of-flight for WLAN localization: feasibility study", 2006, Retrieved from the Internet: URL:http://doc.utwente.nl/65605/1/TechnicalReport.pdf [retrieved on Dec. 21, 2011.

* cited by examiner

ENSURING PHYSICAL LOCALITY OF ENTITIES SHARING DATA

TECHNICAL FIELD

Embodiments of the invention relate generally to ensuring that data is utilized within a predetermined physical domain, and, more particularly, ensuring that protected data is utilized only if a distance between a transmittal node and a reception node is within a distance limit.

BACKGROUND

Content owners, such as motion picture studios and broadcasters, in many circumstances wish to limit the distribution of content to a narrow physical span, such as within a single dwelling. Networking technology makes this restriction difficult to enforce as networks can contain devices that exist in widely varying locations. Given that much of the advertising and content distribution timing (for example, release windows of the content, sports blackouts, etc.) are location based, there is a desire to restrict content access to the span of a single location, such as a single home, residence, or office.

Attempts have been made to provide use limitation based on IP (Internet Protocol) hop counting. IP provides a mechanism for counting the number of routers or other intermediate nodes a packet passes through when traveling between a source and a destination. For example, FIG. 1A shows the path that a packet might take from a data source 101 to a local destination 103 and a remote destination 105. Under a hop-counting based method, the source might be limited to transmitting data through a maximum of one hop. In that case, it would be able to transmit to the local destination 103, but would be prohibited from transmitting to remote destination 105.

However, modern virtual private network (VPN) technology may make this approach ineffectual. A VPN connection between two nodes that are physically distant can hide the intermediate nodes between the two endpoints. For example, as shown in FIG. 1B, a user might create a VPN connection 107 between a data source 101 and a remote destination 105. Because data packets traveling over the VPN connection will not generally see the intermediate nodes, a packet can travel a great distance while staying within the IP hop count limit. Therefore, there is a need for a system that can enforce geographical limitations and without being bypassed through the use of a VPN connection.

SUMMARY OF THE INVENTION

A method and apparatus are provided for ensuring physical locality of entities sharing data.

In a first aspect, a method of controlling distribution of data between entities includes estimating a distance between a first entity and a second entity, and distributing the data between the first entity and the second entity only if the estimated distance between the first entity and the second entity is within a threshold distance for the data.

In a second aspect, an apparatus includes a distance module to estimate the distance from the apparatus to a second apparatus, and a decision module to decide whether a data transmission between the apparatus and the second apparatus is authorized based on a comparison of the distance estimate to a distance threshold.

In a third aspect, a system for controlling distribution of data includes a source to transmit data and a sink to receive the data. The system further includes a distance module to estimate a distance between the source and the sink, and a decision module to allow the data to be distributed only if the estimated distance is within a threshold distance for the data.

BRIEF DESCRIPTION OF THE DRAWINGS

Embodiments of the inventions may be understood by referring to the following description and accompanying drawings that are used to illustrate embodiments. However, embodiments of the invention are not limited to the details of these drawings.

DETAILED DESCRIPTION

Figure 1A:
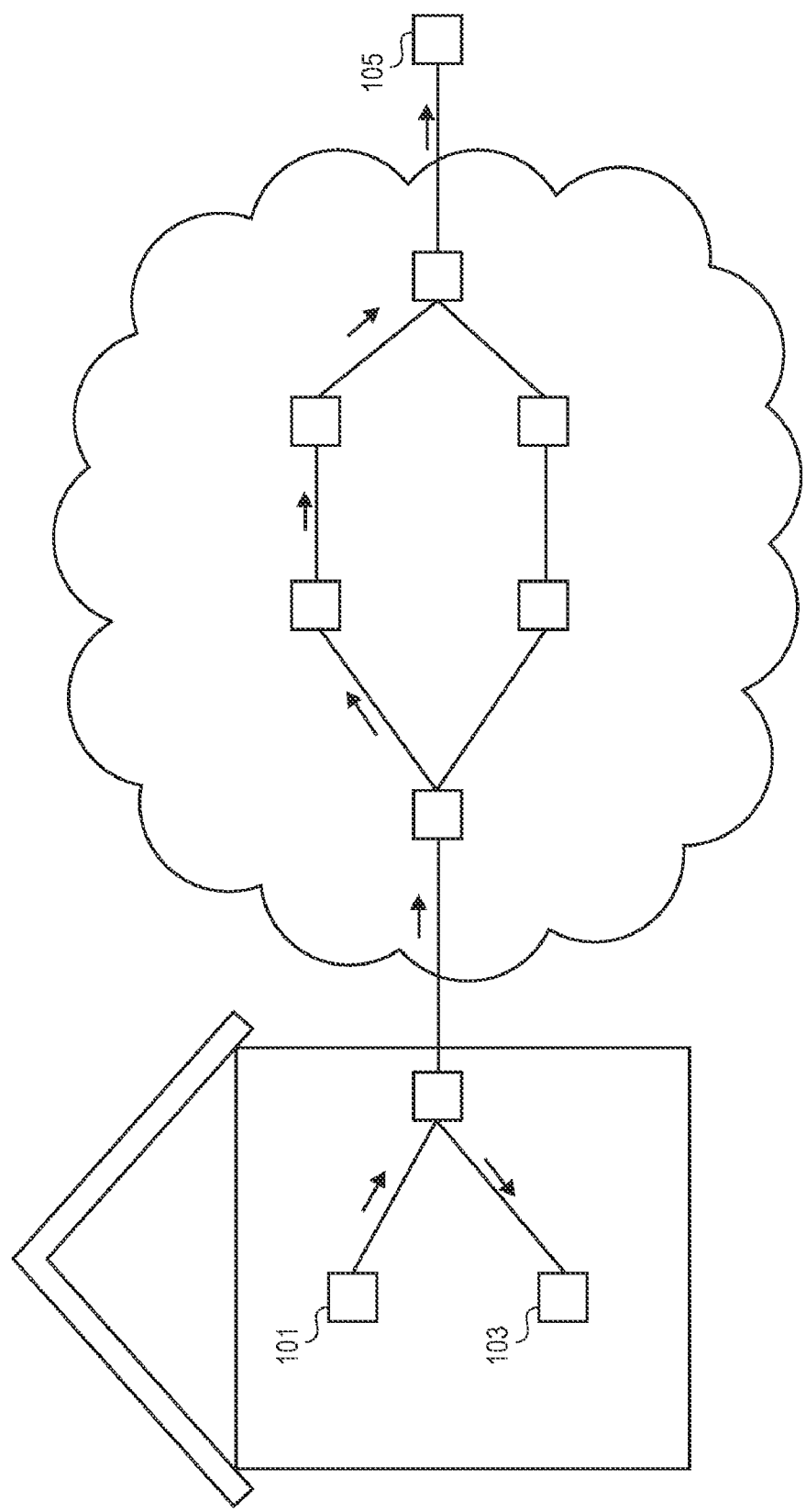
FIGS. 1A and 1B are schematic diagrams showing a conventional method for estimating distance between points in a network.

A method and apparatus are provided for ensuring physical locality of entities sharing data.

As used herein, a "personal domain" is the set of devices that can be considered part of a single entity.

In some embodiments, a means is provided for restricting the physical distance between devices within a personal domain. In some embodiments, the binding of data may be limited to a number of devices that belong to a single personal domain, e.g. a billable entity, family, home, residence, office or other entity. In some embodiments, constituent devices within a personal domain are required to exist within a prescribed physical distance from one another in order to utilize data, including, for example, the display of media content.

In some embodiments, a system provides for admission control to data based on distance requirements between two endpoints. In some embodiments, the data exchanged includes media data, but embodiments are not limited to any particular type of data. In some embodiments, the distance requirements include a maximum distance threshold between the two endpoints, a minimum distance threshold between the endpoints, or a combination of maximum and minimum distance thresholds providing a range in which admission is allowed (or, alternatively, a range in which admission is prohibited).

Multiple methods may be utilized to determine whether two physical entities are within a distance threshold. The distance may be determined directly or indirectly. In some embodiments, measurements may be made by sending a data element, such as a data packet, between the endpoints and measuring the time for the data transit (which may be referred to herein as a "wire delay", regardless of the physical medium of the network connection). A direct measurement may be made by the endpoints if a relationship between a clock for a first endpoint and a clock for the second endpoint is known or may be discovered. The clock relationship may include, but is not limited to, a synchronization of the clock for the endpoints (such that the relationship is that the clocks match). The relationship may be established utilizing a protocol for this purpose (such as NTP—Network Time Protocol). In some embodiments, a single endpoint may determine the wire time indirectly, such as by sending a "ping" packet from a first endpoint, and receiving a returned packet from the second endpoint. Such processes are more fully described below. Upon discovering the wire delay, the distance may be determined by concerting the time to a distance using a speed of the signal over the wired connection.

In some embodiments, the distance determination may be made accurately with limited resources. In some embodiments, all internal processing is taken into account in the time measurements. In an embodiment, the processing is accounted for using highly precise timestamps for the transmitted packets, such timestamps being determined when a packet begins transmission on the network medium and when a packet is first received on the network medium. In some embodiments, the timestamps may be generated as a bit is being applied to the wire or channel or received on such wire or channel through the use of specialized hardware. However, such specialized hardware support is not required in all embodiments. The accurate determination of transmission and receipt occurrences allows for precise calculations that account for delays due to internal processing and thus allow separation of the time actually spent in transversing the wire between the first endpoint and the second endpoint. In some embodiments, the distance determination mechanism is independent of the physical medium or mix of physical media of the network, and may be used in general for any wired or wireless connection. The type of connection between nodes is not relevant in the determination process.

In some embodiments, a distance determination process operates without regard to any internal nodes of the network, thus without regard to any nodes that are between the first endpoint and the second endpoint. If a packet must pass through a node (such as, for example, an Ethernet switch) that is not accounted for, a system will arrive at a larger distance, which is generally safe for determination of an upper bound (because an endpoint that is beyond an upper distance threshold will appear to be further away and thus still outside the distance threshold). The delay through the interior node is generally variable because of buffering and contention for internal resources, but the smallest variable value will be closest to the true value for distance, and thus the minimum observed value can be used as the most accurate measurement. In some embodiments, greater accuracy is provided through operation of interior nodes that operate with the distance measurement protocol, such as by recording processing delays occurring between when packets are first received and when packets are first forwarded. In some embodiments, an interior node may record a time when a first bit is received and a time when the first bit is transmitted, with the difference time between receipt and reception being recorded in the packet. For example, the difference time could be added to the end of the packet to provide a sequence of processing delays, or the processing delay could be accumulated in a field in the packet.

In some embodiments, a distance determination mechanism may be implemented within existing protocols. The distance determination scheme may be encapsulated within existing networking protocols, such as ARP (Address Resolution Protocol) or ICMP (Internet Control Message Protocol), allowing the process to be carried through legacy network devices.

In some embodiments, security is provided to prevent a malicious user from defeating the network admission control by, for example, inserting artificially large processing delays into packets to reduce the apparent distance to the second endpoint, or otherwise manipulating the distance calculation. In some embodiments, a security layer is added to ensure that only trusted devices can provide information related to wire delay calculations. In some embodiments, each cooperating node is required to have a certificate from a central authority that authenticates the node as being in compliance with the protocol. In some embodiments, the certificate may be used to establish encrypted communications between nodes, and to attach a secure signature to a packet to allow a recipient to verify the source of data and verify that the data has not been modified by an unauthorized node. In this manner, clock relationship exchanges can be encrypted using standard protocols, and received timestamps can be verified as being accurate. In an indirect distance measurement, each node that provides a processing delay could, for example, append the delay value to the end of the packet and sign such value to guard against tampering. In another embodiment, a global session key could be established across the nodes to allow intermediate nodes to decrypt a message, update the accumulated processing delay, and re-encrypt and sign the message.

A method and apparatus for content protection in an open architecture system are detailed in "METHOD AND APPARATUS FOR CONTENT PROTECTION WITHIN AN OPEN ARCHITECTURE SYSTEM" filed Oct. 19, 2004 as application Ser. No. 10/968,741, which is hereby incorporated by reference. The described system in such application includes securing content within an open system, such as a personal computer.

Figure 2:
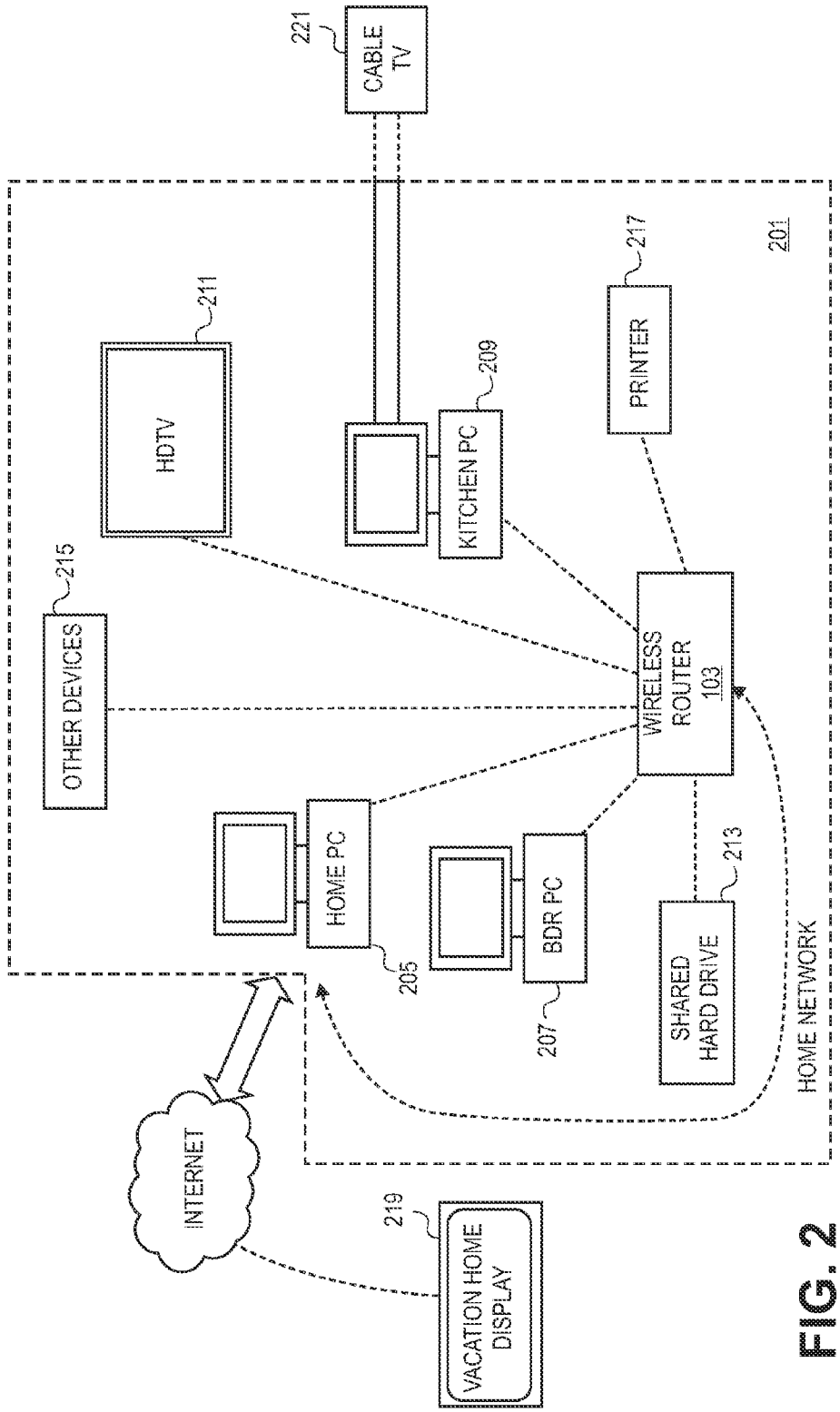
FIG. 2 is a schematic diagram of an exemplary personal domain, such as a home network.

FIG. 2 shows a schematic diagram of an exemplary personal domain. FIG. 2 provides simply one example of a personal domain, and large variations in configuration of the personal domain may be implemented, such as personal domains having less than or more than the number of devices than are shown in FIG. 2 may be implemented, or including different types of devices. The personal domain in this example is a home network 201 which includes a wireless router 203, a primary personal computer (PC) 205, a bedroom PC 207, a kitchen PC 209, a HDTV audio/visual display 211, a shared hard drive 213, other devices 215, and a printer 217. Although the home network 201 is shown as a wireless network, a wired network (or a combination of wired and wireless) may also be implemented to connect the components of the personal domain. Moreover, the home network 201 is shown in FIG. 2 as having access to the Internet through a wireless router 203, but access may be provided through any access device or interface.

Additionally, another input to the home network may be a cable TV source 221 that provides television programming to the home network 201. In this example, the cable TV source is provided to the kitchen PC 209.

As is known in the art, the wireless router 203 may be used to allow sharing of data between components of the personal domain. For example, the hard drive 213 may serve multimedia content to the kitchen PC 209 or the HDTV 211. As noted above, the wireless router 203 may be connected using a virtual private network (such as through an Internet or other connection) to a device outside the physical premises of the home. In FIG. 2, the router 203 is connected to the Internet, which in turn can be connected to, in one example, a vacation home display 219. In this manner, content that is originated from any of the components in the home network 201 could be streamed to the vacation home display 219. Because of the advent of easy-to-configure personal domains, protected data may now be distributed across wide geographic regions without the data owner's permission.

Advances in technology have significantly expanded the possibilities for these personal domains. Where in the past a home network might have only included a few computers, a modern personal domain may also include a variety of devices that were not previously networked, such as televisions and other entertainment devices. In some embodiments, media may be stored in many different locations. For example, a person might store family pictures on a home PC 205 and store video on a shared hard drive 213. Similarly, a person might wish to view that media on many different devices. For example, a person may want to watch stored video on a kitchen PC 209 and show a slideshow of vacation pictures on a HDTV display 211. The person might even want to send the live cable TV signal 221 from the kitchen PC to another device in the house, or even to a vacation home display 219 in an entirely different location. Thus, a prevailing model in the personal domain may be more likely to be peer-to-peer, rather than client-server. Because of this, it is likely that a centralized solution for limiting distribution of data would not be effective.

In some embodiments, various processes are used to estimate the physical distance that a packet will travel in going from a source device to a sink device, such as by obtaining a reliable estimate of the time that a packet takes to travel from source to destination. In some embodiments, a distance estimation may be made through direct measurement using network devices or it may be made indirectly from a single endpoint.

In some embodiments, direct measurement processes may include synchronization of clocks and time-stamped packets on the transmitter or similar processes for accurate calculation of time for a packet to travel from a first point to a second point. In this process, the difference between the transmission time and the reception time is the propagation time through the network, which is indicative of distance.

In some embodiments for direct determination, methods include various mechanisms to bound the variable portions of the delay impressed on packets as they traverse switches in order to derive measurements of the network delay between arbitrary nodes within an interconnected network. With these mechanisms, a reliable estimate of the physical distance between nodes can be determined, and those nodes that are determined to exist beyond the allowable physical diameter defined for a personal (physical) domain can be excluded from the domain. In some embodiments, the threshold value used to make such a determination may be set at a single value for the system, but in other embodiments the threshold or thresholds may vary depending on certain factors, such as the data that is being transmitted over the network. In one example, content provider A may choose to allow its content to be sent 100 miles over the network, while content provider B may prefer to restrict content to several hundred feet.

In this way, the maximum geographic size of a personal domain can be enforced, thereby ensuring that the relative physical locality of a personal domain falls within the defined maximum bounds set by content owners or broadcasters. In some embodiments, certain specific methods described here for accurate measurement of propagation delays between network nodes may be utilized; however, it can be appreciated that multiple methods for determining the propagation delay may be used.

Figure 3:
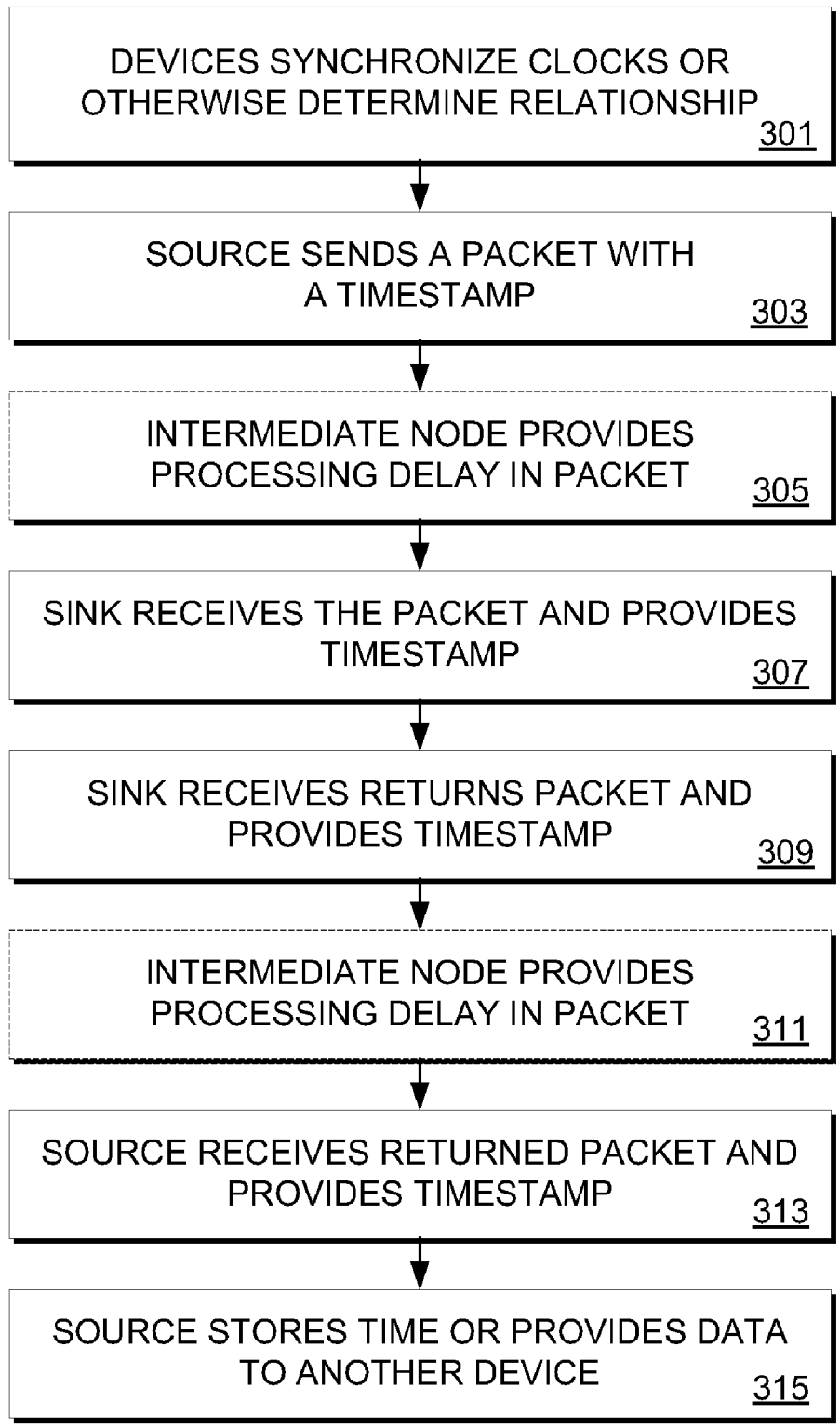
FIG. 3 is a flow diagram showing a mechanism for determining propagation delay between devices.

FIG. 3 is a flow diagram showing a mechanism for determining propagation delay between devices. In this process, the source and sink devices may utilize a clock synchronization process, such as Network Time Protocol (NTP). NTP is one example of a well-known method for disseminating highly-accurate time information over a network and is commonly used to synchronize clocks over the Internet, but embodiments of the invention that utilize clock relationships are not limited to any particular mechanism for establishing or determining the clock relationships. The fundamental elements of a system implementing NTP are a small set of servers (called Stratum 0) that are directly connected to atomic clocks or other very accurate timekeeping systems. These servers provide time information to a larger set of servers (called Stratum 1), which can then provide time information to an even broader set of devices. NTP also allows for additional levels of dissemination (called strata), although most devices on the Internet operate at Stratum 2. At each layer, the time measurement received may become less accurate, as network delays increase uncertainty. The receiving devices may reduce this uncertainty by sending multiple requests and filtering the received data, but some uncertainty remains. However, because the time at the Stratum 0 servers is accurate to at least picoseconds, the time is still highly accurate even at lower strata. In one embodiment of the present invention, devices in the personal domain synchronize their internal time to an NTP server somewhere on the Internet.

In an alternate embodiment, a local NTP server is used instead. In this embodiment, one of the devices in the personal domain is configured as an NTP server. Other devices in the personal domain may then receive their time from this server.

Although NTP is a particularly well-known method for synchronizing clocks, it is not the only option. IEEE's 802.1 as standard provides an alternate means for synchronizing clocks to a master clock server on the local network. As with NTP, devices using 802.1 as exchange multiple messages with the clock server in order to achieve greater clock accuracy.

As illustrated above, there are multiple ways of ensuring that the devices, also referred to specifically as sources (devices providing data) and sinks (devices receiving data) are appropriately maintaining synchronized clocks.

In FIG. 3, a flow diagram illustrates one process for determining a propagation delay between a source and a sink. In block 301, the devices in the personal domain may synchronize their clocks or otherwise determine the relative relationship between clocks. The devices may utilize a process, such as, for example, a local or Internet NTP server, to synchronize their clocks or otherwise determine a clock relationship. A clock synchronization can be performed at any time before the source is asked to initiate a transmission, although the synchronization may be required to be performed frequently enough to ensure that the device clocks remain accurately synchronized.

In block 303, the source sends the sink a test packet containing a timestamp with the transmission time. In an embodiment, the test packet is constructed so that the packet is time-stamped immediately upon being sent, as the first bit is applied to the transmission medium, so that delays in transmission at the source are not included in propagation delay calculations.

In block 305, one or more intermediate devices may be encountered in the packet transmission. In an embodiment, an intermediate device operates in accordance with the distance determination protocol and provides a processing delay value in the packet.

In block 307, the sink receives and processes the test packet, noting the time that it received the packet. In a similar manner as the packet transmission in block 303, the receive time may be recorded when the sink starts to receive the packet, as the first bit is received, so that delays in receiving at the sink are not included in delay calculations. In another embodiment, the sink could record the processing time rather than inserting timestamps in the packet, and could provide such data when needed.

In block 309, after processing the test packet, the sink returns a packet, with a timestamp being recorded when the first bit of the packet is transmitted. One or more intermediate nodes may again be encountered on the return, and the nodes may again provide their processing delays in the packet, block 311.

Then, in block 313, the source receives the returned packet, for example recording a timestamp as the first bit of the packet is received. In some embodiments, the source may store the propagation time or provide such time to another device for determination of distance 315. One skilled in the art will appreciate that the propagation delay data can be stored in any number of locations, including on the source, on the sink or on a separate data management device, which may include a media management device. In embodiments of the invention, in general it is only necessary that the information be available when needed for use in determining a distance based on the propagation delay.

The process provided in FIG. 3 may further include the implementation of a security protocol in the illustrated processes. Thus, assurance may be provided that the devices are authorized to provide the time data and that the time data is provided accurately.

Figure 4:
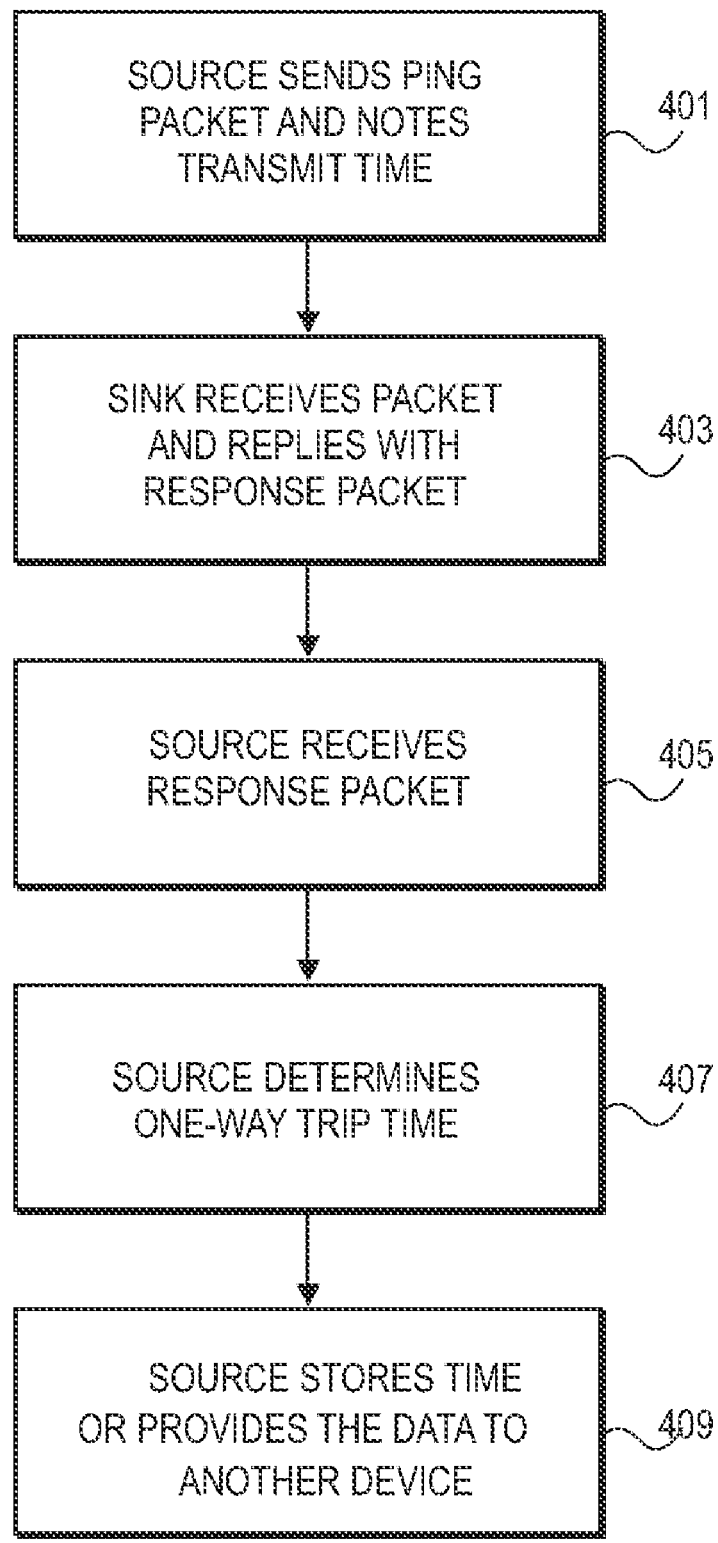
FIG. 4 is a flowchart to illustrate a process for determining propagation delay indirectly using a packet transmission.

FIG. 4 is a flowchart to illustrate a process for determining propagation delay indirectly using a packet transmission. A network "ping" is a well-known method that is commonly used, for example, to test whether a particular device is connected to a network. In block 401, the source sends a ping packet to the sink and notes the transmit time. In block 403, the sink receives the ping packet and replies with a response packet. In block 405, the source receives the response packet and notes the receive time. In some embodiments, as with a synchronized clock mechanism, the source operates to record the transmit and receive times in a manner such that the propagation delay generally includes network delays, but does not include local delays. In some embodiments, the transmit time is noted at the time the first bit of the ping packet is transmitted, and the receive time is noted at the time the first bit of the reply is received. In block 407, the source determines the round-trip time by subtracting transmit time from receive time. In general, network delays will be the largest component of the round-trip time, and the network transit time is generally the same in both directions. Therefore, the propagation delay from source to sink will be about equal to half of the round-trip time. In block 409, the source may store the propagation delay data locally or in a known place elsewhere in the personal domain. A determination of the propagation time is further illustrated in FIG. 8, as described below.

Although the examples described here may utilize one or two packet transactions to estimate propagation delay, one skilled in the art will appreciate that the measurement of the propagation delay may be made more accurate by repeating these transactions and filtering the results. Because the intent of such process is to measure the time the packet spends on the transmission lines (as a proxy for distance), it is desirable to have an estimate that to the degree possible excludes external delays, such as time spent queuing at intermediate devices. Because variable delays can only increase the propagation delay, the lowest measured time in a sequence of measurements will provide the best estimate of the delay representing the time for data to travel on the transmission lines. In some embodiments, the source can repeat the methods described above in order to weed out the effects of external delays. Once a reliable estimate of propagation delay has been made, distance can be estimated by multiplying the propagation delay by the speed at which the signal moves in the wire or over the air, which is approximately 1 foot per nanosecond.

Figure 1B:
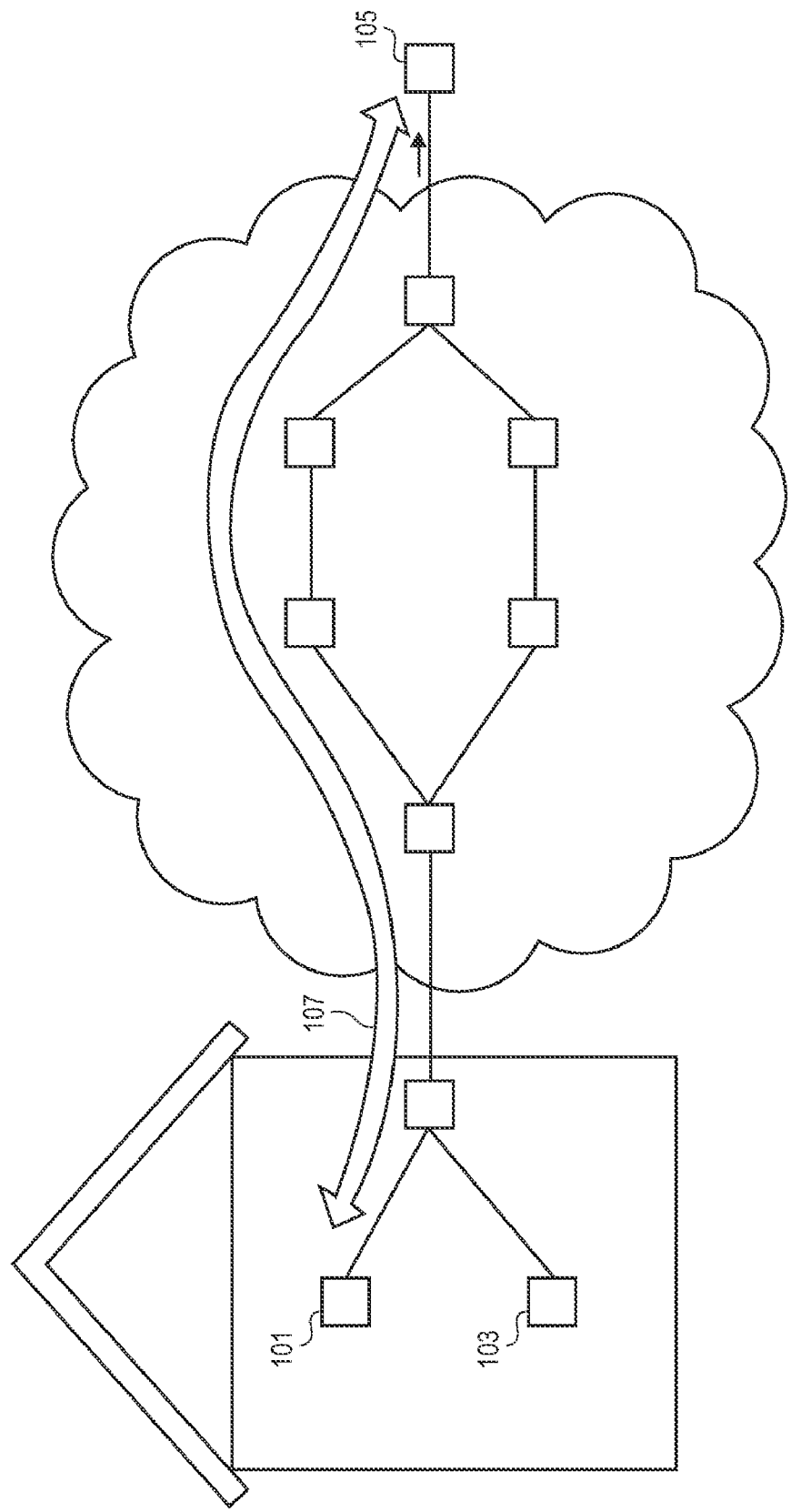
Figure 5:
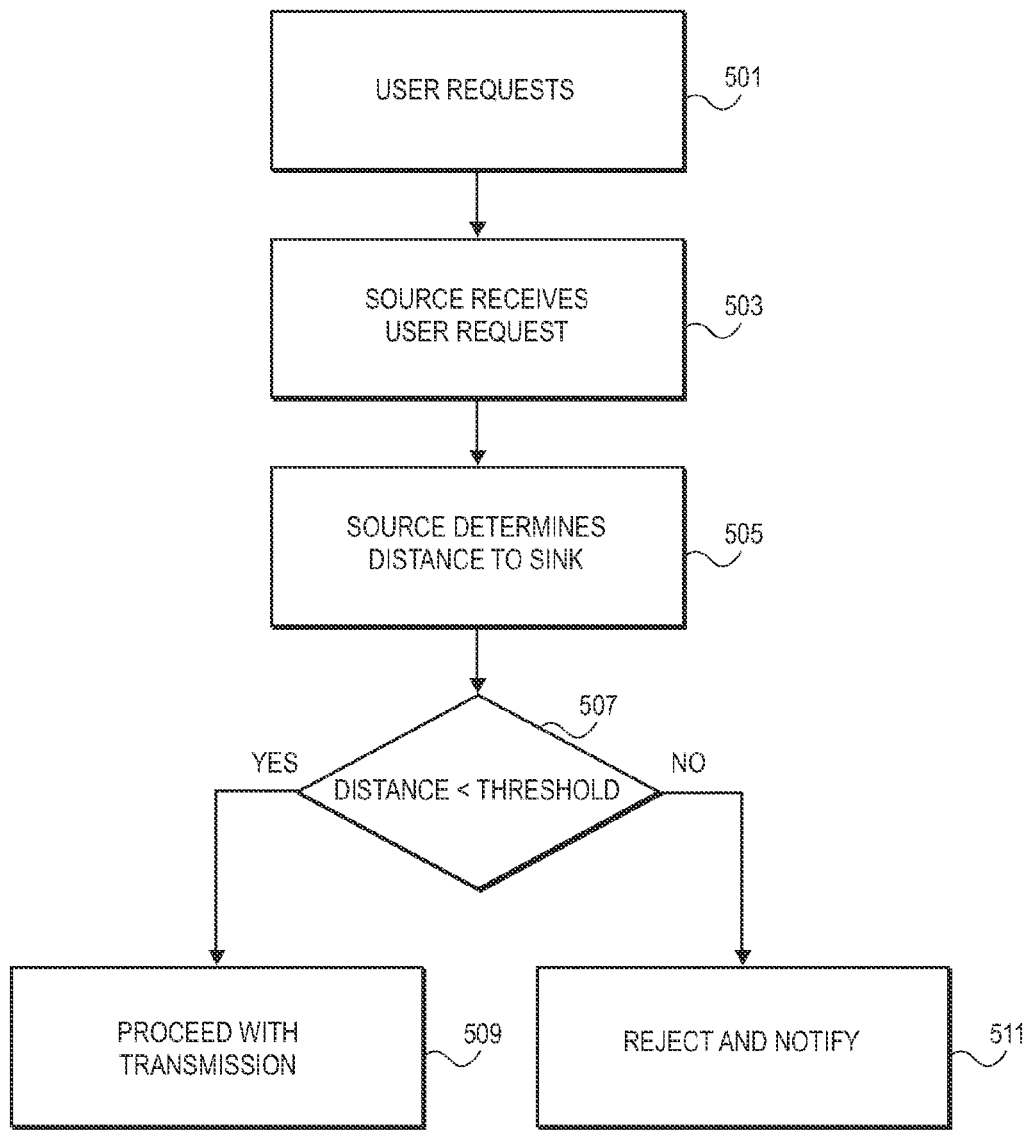
FIG. 5 is a flow diagram for one embodiment in which the source makes the decision whether or not to transmit data based upon distance.

A decision to transmit data, such as media content, can be made in several different places in the system. FIG. 5 shows a flow diagram for one embodiment in which the source makes the decision whether or not to transmit data. In block 501, the user (sink) makes a request to stream particular content. For example, in the network in FIG. 1, a user might request the kitchen PC 209 to stream the cable TV signal 221 to the HDTV display 211. In block 503, the source receives the request and begins to process it.

In block 505, the source determines the distance to the sink using one of the mechanisms described above or some other method. The source may determine the distance at this time, or it may use a previously determined value. The previously determined value may be stored locally or it may be obtained from a remote storage location. If the value previously stored was a propagation delay, the source converts the time to an estimate of the distance between source and sink. It then proceeds to decision block 507, where it evaluates whether the determined distance is less than a set threshold (which may be a single threshold for the system or may be determined by the content being transmitted). While for ease of explanation this illustration and the illustrations provided in FIGS. 6 and 7, described below, utilize an upper threshold for distance, this is not required in all embodiments. In some embodiments there may be instances in which a lower distance threshold may be applicable, and distances less than the threshold may be rejected. In some embodiments, other limitations may apply, such as circumstances in which both a lower distance threshold and upper distance threshold are applied, thus limiting the area to a band that is at least the lower threshold but no more than the upper threshold.

In the example provided in FIG. 5, if the distance is less than the threshold, the source continues to block 509, where it proceeds with the transmission and carries out the steps necessary to make the connection with the sink. If the distance is greater than the threshold, the source continues to block 511, in which case it rejects the request and may notify the user that it cannot make the transmission.

Figure 6:
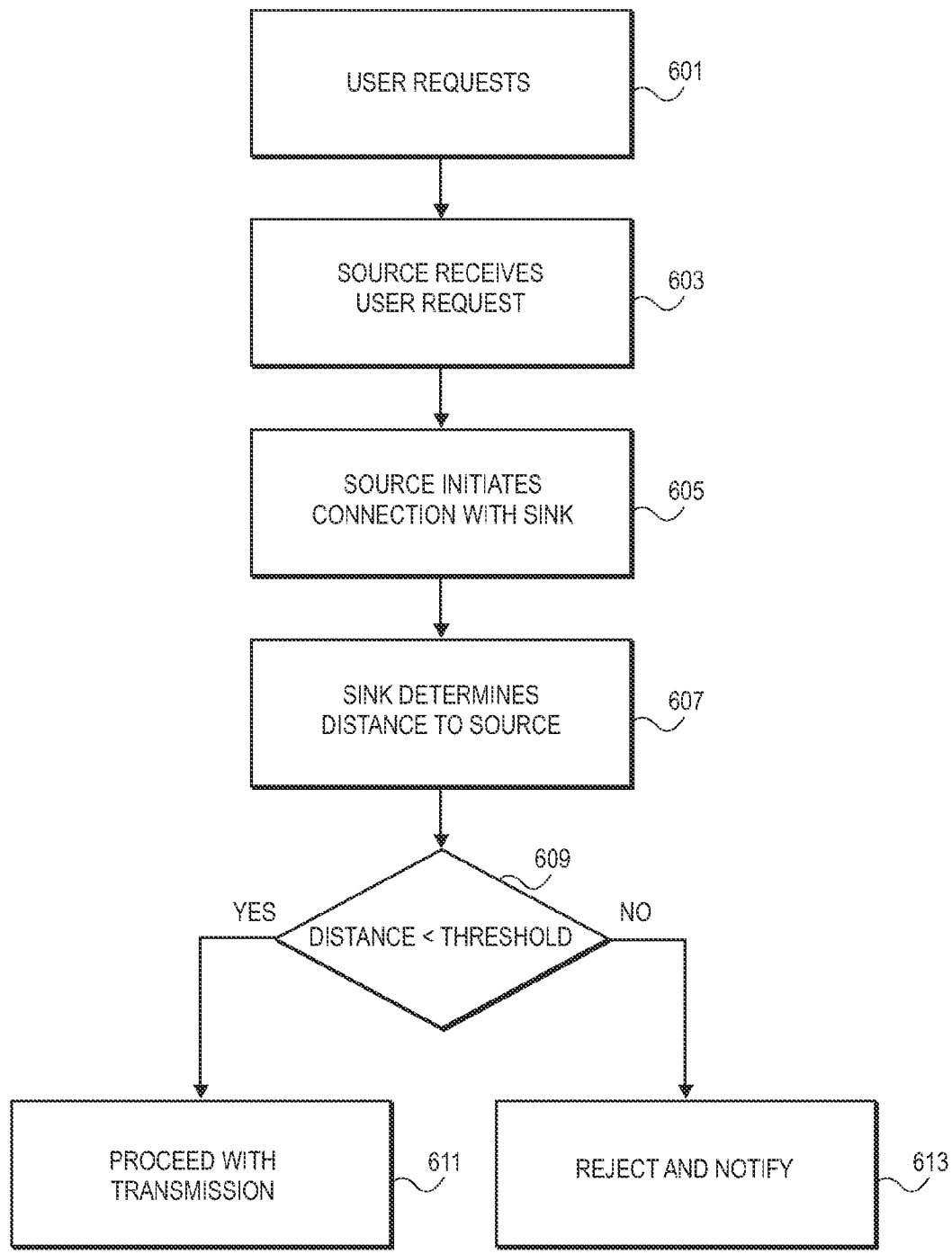
FIG. 6 is a flow diagram for one embodiment in which the sink makes the decision whether or not to transmit based upon distance.

In an alternate embodiment, the sink decides whether to reject the user's request, as shown in the flow diagram in FIG. 6. In this embodiment, the initial steps are the same as, or similar to, those shown in FIG. 5, as the user requests content in block 601 and the source receives the request in block 603. The process shown in FIG. 6 diverges from the previously described process in block 605, where the source initiates the connection with the sink. In block 607, the sink determines the distance between the source and the sink using, for example, the methods discussed above. As with the previous method, the distance may be determined at this time or may have been previously determined. In decision block 609, the sink evaluates whether the determined distance is less than the set distance threshold. If the distance is less than the threshold, the sink goes to block 611, where it completes the connection with the source and receives the content data. If the distance is greater than the distance threshold, the sink continues with to block 611, in which case the sink refuses to complete the connection. The source may then notify the user that the connection cannot be made.

Figure 7:
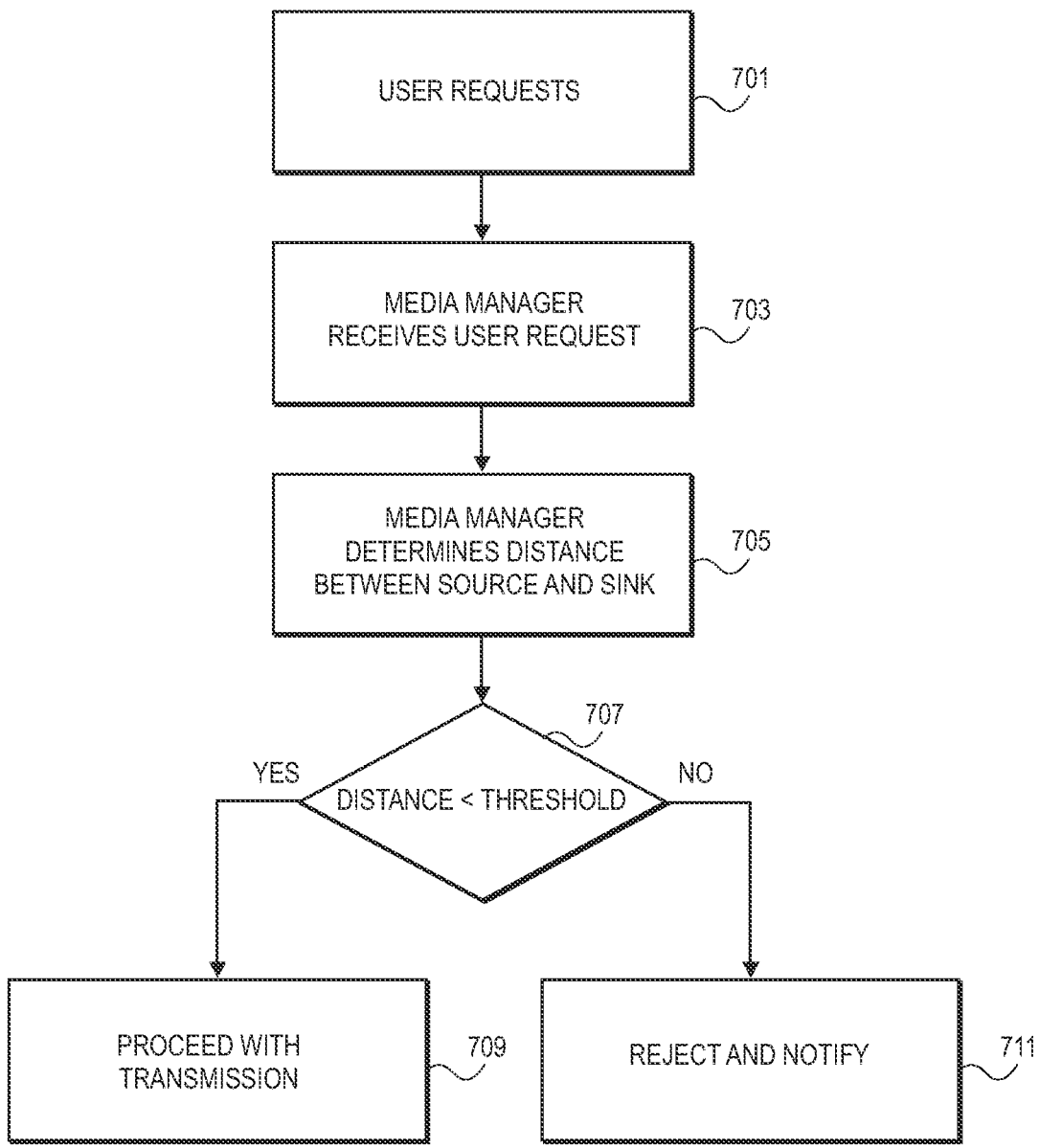
FIG. 7 is a flow diagram for one embodiment in which neither the source nor the sink makes the decision whether or not to transmit data based upon distance.

In another embodiment, a third device (such as a media management device) decides whether the source is permitted to send the content to the sink. For example, in the network illustrated in FIG. 2, a user might use the home PC 205 to request the shared hard drive 213 to stream a movie to the HDTV 211. In this case, the home PC might be used to initiate the connection between the other two devices. FIG. 7 is a flow diagram illustrating an embodiment of a process that may be utilized under these circumstances. In block 701, the user makes the request to the media management device to cause the source send the requested content to the sink. In block 703, the media management device receives the request. In block 705, the media management device determines an estimate of the distance between the source and the sink through one or more methods, such as those described above. The distance determination may include querying the source or the sink to determine the distance, or the information may have been previously distributed and may be stored on the management device. In whatever manner the distance estimate is obtained, the media management device continues to decision block 707, where it evaluates whether the distance is less than the set distance threshold. If the distance is less than the threshold, the media management device continues to block 709, where it proceeds with the connection. This step might include simply requesting the source to initiate the transmission or it might include more complex setup steps. If the distance between source and sink is greater than the threshold, the media management device continues to block 711, where it rejects the user's request and notifies the user that the connection cannot be made.

Although the methods described above specify particular timing for determining propagation delay and determining whether to reject a user request, embodiments are not limited to this particular process and result. For example, one skilled in the art will also appreciate that for some sink devices, it might be preferable to also check the distance between source and sink while transmitting the stream, rather than only when setting up the connection. This might be desirable when the sink is a portable device that might be within an acceptable distance when the connection begins, but later be moved beyond that distance.

In other embodiments, a system may also find the distance between the source and the sink through methods that measure the length of the connecting transmission lines. For example, time-domain reflectometry (TDR) is a well-known method for using signal characteristics, including the reflection of signals that occurs when a signal encounters variations in line impedance, to determine distance between end points on a line. One skilled in the art would appreciate that the methods described above could be also implemented by using TDR or other methods to directly determine the distance between source and sink. Embodiments encompass any such distance determinations.

Figure 8:
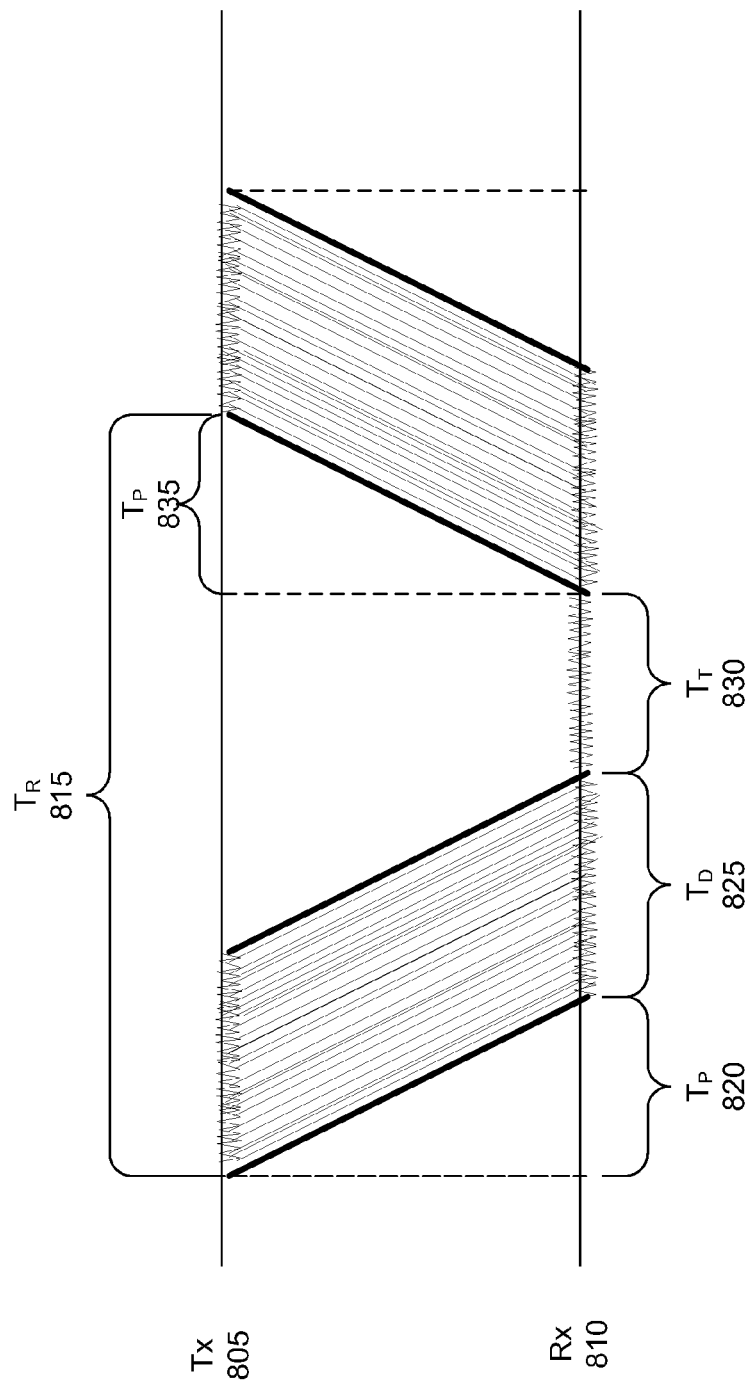
FIG. 8 illustrates a process for determination of distance between devices using a propagation delay.

FIG. 8 illustrates a process for determination of distance between devices using a propagation delay. In this illustration, propagation time ($T_P$) is the time for transmission between a transmitter (Tx) 805 to a receiver (Rx) 810. In a transmission, there is a transmission time $T_P$ 820 from Tx 805 to Rx 810, a data transfer time $T_D$ 825 in the operation of the transmitter, a turnaround time $T_T$ 830 at the receiver (time from receiving ping to sending the return signal), and a $T_P$ for the return trip from Rx 810 to Tx 805 (taking the simplifying assumption that propagation time is symmetric), with a round trip time $T_R$ 815 equaling the total of these times. Thus, the total round trip time is:

$$T_R = (2 \times T_P + T_D + T_T) \quad [1]$$

In this determination, the data transfer time $T_D$ 825 and the turnaround time $T_T$ 830 are known or may be determined for such devices. If these factors are removed, the result is $2 \times T_P$. Because this represents the roundtrip time, which may be measured from the transmitter side, and there may be no need for synchronization of clocks between the devices.

However, in the transmission process there is also a variable propagation delay time $T_{PD}$, which is greater than or equal to zero. As a result, the variable propagation delay plus the actual propagation time $T_{PA}$ will equal the occurring propagation delay:

$$T_P = (T_{PA} + T_{PD}) \quad [2]$$

Because the variable propagation delay is zero or more, this implies that the lowest measured propagation delay in a series of measurements will provide the closest estimate to the actual propagation delay.

Figure 9:
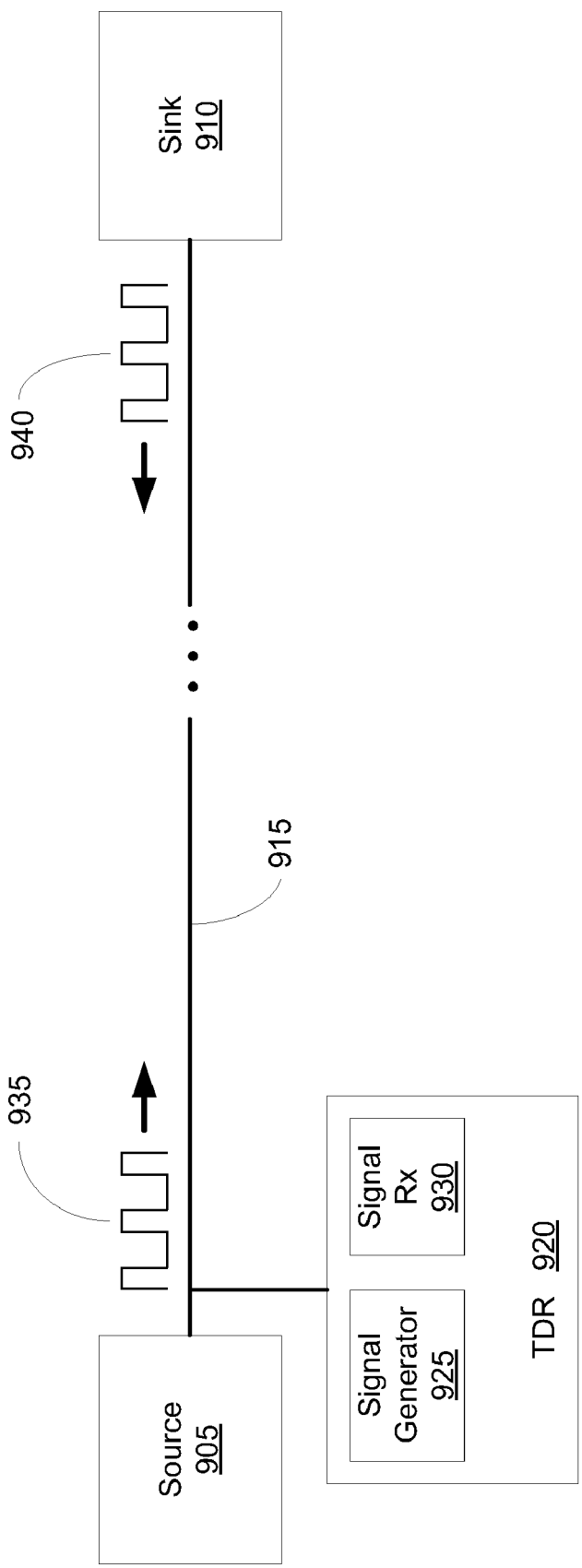
FIG. 9 provides an illustration of a measurement of distance between entities using signal reflection.

FIG. 9 provides an illustration of a measurement of distance between entities using signal reflection. In this illustration, there is a request for transmission of data, such as media content, from a source device 905 to a sink device 910 over a transmission line 915. In order to determine whether the transmission of such data is authorized in this instance, a measurement of the distance between the source 905 and the sink 910 may be made. Using one method of measurement, a TDR device 920 is attached to the transmission line 915 at the location of the source. (The same measurement could be made in the reverse direction at the location of the sink 910.) The TDR 920 includes a signal generator 925 to provide a signal or series of signals 935 on the transmission line 915. Upon encountering discontinuities in impedance, such as occurs upon encountering a device on the transmission line 915, a signal reflection will occur. For example, upon reaching the source device 910, a change in impedance will cause the generation of a reflected signal 940.

The reflected signal 940 may then be detected by a signal receiver 930 in the TDR 920. Because the signal 935 and the reflected signal 940 have in effect made a round trip on the transmission line, one half of the time period beginning with the transmission of the signal 935 and ending with the receipt of the reflected signal will equal the time for transmission from the source 905 to the sink 910, and the distance between source and sink the may then be derived from this transmission time.

Figure 10:
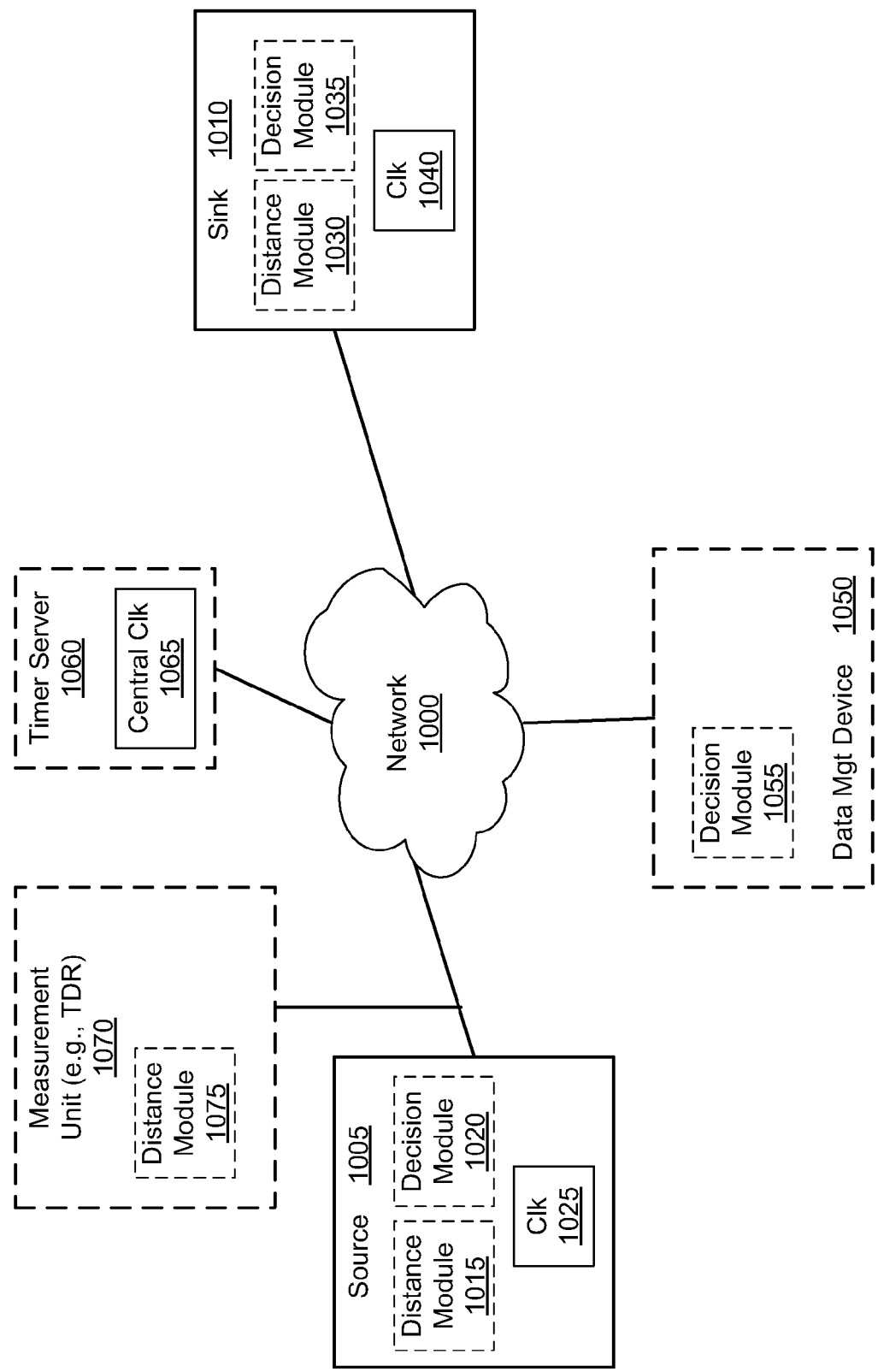
FIG. 10 is an illustration of various embodiments of a system to ensure physical locality of entities sharing data.

FIG. 10 is an illustration of various embodiments of a system to ensure physical locality of entities sharing data. In some embodiments a network 1000 includes a source device 1005 that may request or be requested to provide data to a sink device 1010. In some embodiments, the system includes a module to determine the distance between the two devices and a module to decide whether such distance is within one or more distance thresholds, and thus whether the date transmission should be authorized. The distance determinations and decision processes may be provided in differing devices in various embodiments. The distance determination may be made indirectly or directly. Distance determinations may or may not require clock synchronization.

In some embodiments the source device 1005 may include a distance module 1015 to determine the distance and a decision module 1020 to determine whether the distance is authorized, together with a clock 1025 that may be used in distance determination. In some embodiments the sink device 1010 may include the distance module 1030 to determine the distance and a decision module 1035 to determine whether the distance is authorized, together with a clock 1040 that may be used in distance determination. In some embodiments the determination of authority may be made by a separate entity, such as a data management device 1050 containing a decision module 1055.

In some embodiments the source device 1005 and the sink device 1010 may require synchronization of their clocks for distance determination. The devices may, for example, utilize a time server 1060 to synchronize with the time of a central clock 1065. In some embodiments, distance may be determined using a measurement unit 1070, such as a TDR device, in which case the direct measurement unit 1070 may contain the distance module 1075.

Figure 11:
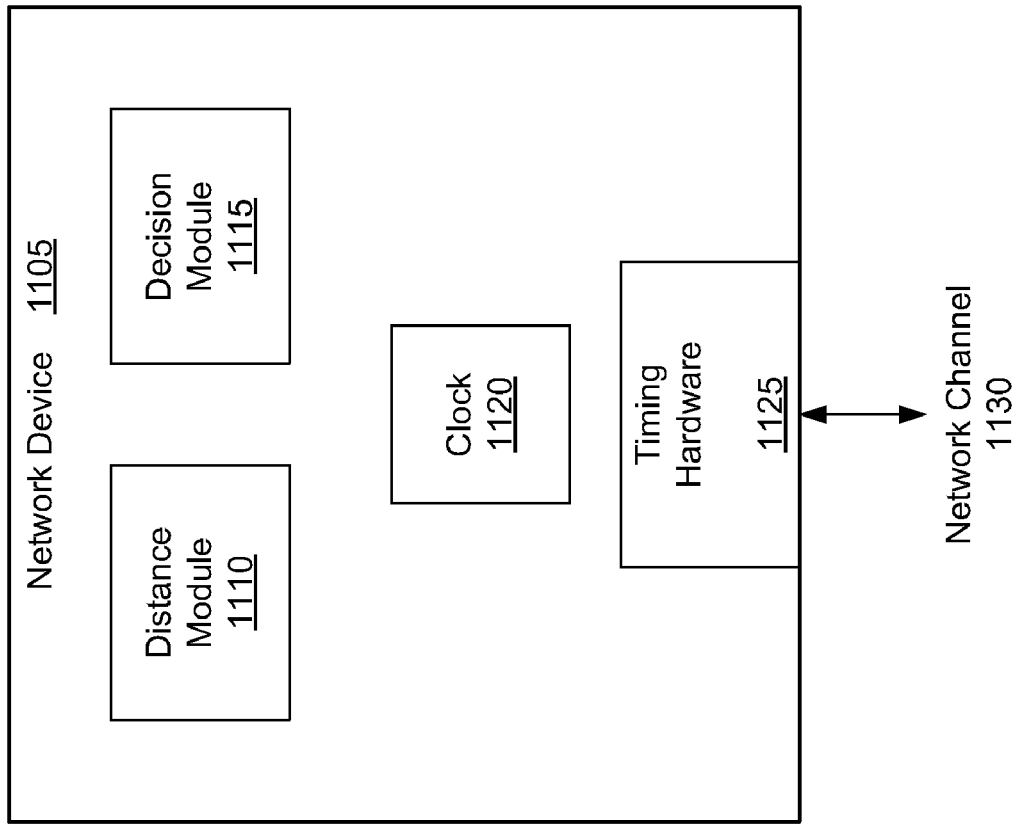
FIG. 11 is an illustration of an embodiment of a network device.

FIG. 11 is an illustration of an embodiment of a network device. In this illustration, a network device 1105 may include a distance module 1110 to determine the distance and a decision module 1115 to determine whether the distance is authorized, together with a clock 1120 that may be used in distance determination.

In this illustration, the network device 1105 may further includes timing hardware 1125 to provide for accurate timestamps for use in distance determinations. The timing hardware 1125 may include specialized hardware to establish a time when a bit is first sent on a network channel 1130, or to establish a time when a first bit is received on the network channel 1130. By providing accurate time measurements, the timing hardware 1125 may assist in limiting time measurements to actual propagation time.

ADDITIONAL INFORMATION AND EMBODIMENTS

The various modules described herein may be provided in hardware, software, firmware, or in any combination of hardware, software, and firmware.

There may be intermediate structure between the illustrated components. The various components described or illustrated herein may have additional inputs or outputs which are not illustrated or described. In actual implementations of the systems of the figures, there would be additional circuitry, control lines, and perhaps interconnects which are not illustrated. When the figures show two blocks connected through conductors, there may be intermediate circuitry that is not illustrated. The conductors mentioned herein do not have to be of continuous material. For example, they may include vias or other connection structures. The shape and relative sizes of the blocks is not intended to relate to actual shapes and relative sizes. The fact that an arrow between blocks is shown in only one direction does not mean that there is not communication in the other direction. A single line between blocks does not mean there are not other conductors between the blocks.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said that element "A" is coupled to element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, when it is said that A is in response to B, A may be in response to the combination of B and C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The invention is not restricted to the particular details described herein. Indeed, many other variations of the foregoing description and drawings may be made within the scope of the present invention. Accordingly, it is the following claims, including any amendments thereto, and not the above description, that define the scope of the invention.

What is claimed is:

1. A method of controlling distribution of data between entities in a wired network comprising:
   estimating a distance between a first entity and a second entity including determining a propagation delay for a signal transmission between the first entity and the second entity across the wired network and calculating a distance based on the propagation delay, wherein the determination of the propagation delay includes:
   determining a relationship between a clock in the first entity and a clock in the second entity, wherein establishing the relationship between the clock of the first entity and the clock of the second entity includes synchronizing the clocks to a time server;
   transmitting a data packet from the first entity to the second entity over the wired network, the packet containing a transmission time;
   receiving the data packet at each of one or more intermediate nodes in a path for the data packet between the first entity and the second entity, determining and inserting a processing delay for each of the one or more intermediate node in the data packet, and retransmitting the data packet from each of the one or more intermediate nodes;
   receiving the packet at the second entity at a receive time;
   returning the packet from the second entity at a second transmission time;
   receiving the returned packet at each of one or more intermediate nodes in a path for the return packet between the second entity and the first entity, determining and inserting a processing delay for each of the one or more intermediates node in the returned packet, and retransmitting the returned packet from each of the one or more intermediate nodes;
   receiving the returned packet at the first entity at a second receive time;
   determining the propagation delay using the transmission times and the receive times for the first and second entities and the processing delays for the intermediate nodes; and
   distributing the data between the first entity and the second entity only if the estimated distance between the first entity and the second entity is within a distance threshold for the data.

2. The method of claim 1, further comprising establishing the transmission time when a first bit of the packet is transmitted on the network, and establishing the receive time when the first bit of the packet is received on the network.

3. The method of claim 1, further comprising authenticating the identity of each intermediate node receiving the data packet or the returned packet.

4. The method of claim 3, wherein the data packet and returned packet are encrypted, and wherein each intermediate node decrypts the data packet or returned packet to insert the processing time, and re-encrypts the data packet or returned packet for transmission.

5. The method of claim 1, wherein the threshold distance varies depending on the content being distributed.

6. An apparatus comprising;
a distance module configured to estimate the distance from the apparatus to a second apparatus in a wired network, the distance module being configured to determine a propagation delay for a data packet sent between the apparatus and the second apparatus across the wired network and to estimate the distance based on a propagation delay; and
timing hardware including a clock to measure time for transmitting and receiving the data packet, wherein the determination of the propagation delay includes:
determining a relationship between the clock and a second clock in the second apparatus, wherein establishing the relationship between the clock and the second clock in the second entity includes synchronizing the clocks to a time server;
transmitting a packet from the apparatus to the second apparatus over the wired network, the packet containing a transmission time, the packet being received at the second apparatus at a receive time and being returned from the second apparatus at a second transmission time;
receiving the returned packet at the apparatus at a second receive time, the returned packet including processing delay times for one or more intermediate nodes on a path for the transmitted packet between the apparatus and the second apparatus and for one or more intermediate nodes on a path for the returned packet on a path from second apparatus to the apparatus, each intermediate node inserting the delay time for the intermediate node into the packet or returned packet; and
determining the propagation delay based upon the transmission times and the receive times for the apparatus and the second apparatus and on the intermediate node processing delay times;
wherein a decision module is to decide whether a data transmission between the apparatus and the second apparatus is authorized based on a comparison of the distance estimate to a distance threshold.

7. The apparatus of claim 6, wherein the timing hardware is utilized to determine a transmission time when a first bit of the packet is placed on the network, to determine a receive time when the first bit of the packet is received on the network, or both.

8. The apparatus of claim 6, wherein the decision module is contained in the apparatus.

9. The apparatus of claim 6, wherein the decision module is contained in a device distinct from the apparatus or the second apparatus.

10. The method of claim 1, wherein the one or more intermediate nodes for the path for the data packet between the first entity and the second entity are different than the one or more intermediate nodes for the path for the return packet between the second entity and the first entity.

* * * * *